United States Patent [19]

Otis et al.

[11] 4,379,807
[45] Apr. 12, 1983

[54] MAGNET WIRE FOR HERMETIC MOTORS

[75] Inventors: Harold R. Otis; Charles E. Blake, both of Fort Wayne, Ind.

[73] Assignee: Rea Magnet Wire Co., Inc., Fort Wayne, Ind.

[21] Appl. No.: 243,587

[22] Filed: Mar. 13, 1981

[51] Int. Cl.³ .............................................. B32B 27/00
[52] U.S. Cl. .............................. 428/383; 174/120 SR; 174/120 C; 428/380
[58] Field of Search ....................... 428/375, 379, 383; 174/120 SR, 120 C, 110 N, 110 SR; 252/52 R

[56] References Cited

U.S. PATENT DOCUMENTS

| | | | |
|---|---|---|---|
| 2,425,755 | 8/1947 | Roberts et al. | 252/52 A |
| 2,425,845 | 8/1947 | Toussaint et al. | 260/615 |
| 3,632,440 | 1/1972 | Preston | 117/218 |
| 3,745,138 | 7/1973 | Koerner et al. | 260/33.4 UR |
| 3,917,892 | 11/1975 | Kawaguchi et al. | 428/383 |
| 3,975,571 | 8/1976 | Kawaguchi et al. | 428/371 |
| 4,004,063 | 1/1977 | Peterson et al. | 428/383 |
| 4,111,819 | 9/1978 | Muijs | 252/52 A |
| 4,111,820 | 9/1978 | Conti | 252/52 A |
| 4,216,263 | 8/1980 | Otis et al. | 428/383 |

Primary Examiner—Lorraine T. Kendell
Attorney, Agent, or Firm—Glenn E. Klepac

[57] ABSTRACT

A magnet wire suitable for use in hermetic motors comprising a conductor wire, an insulating intermediate layer, a polyamide outer layer, and an organic polymeric lubricant coating on the outer layer. The lubricant has a pour point below about 15° F. (−9° C.) and wets the outer layer. A preferred lubricant is soluble in monochlorodifluoromethane and in dichlorodifluoromethane, and comprises a saturated $C_2$-$C_4$ ether of ethylene oxide and 1,2-propylene oxide copolymers. A particularly preferred lubricant has a viscosity of about 100 to 400 SUS (21 to 87 centistokes) and a pour point of about −60° F. (−51° C.).

7 Claims, 1 Drawing Figure

MAGNET WIRE FOR HERMETIC MOTORS

BACKGROUND OF THE INVENTION

1. Field of the Invention

The present invention relates to a magnet wire suitable for use in hermetically sealed electric motors, commonly referred to as hermetic motors. Such motors are disclosed, for example, in Hannibal et al U.S. Pat. Nos. 3,445,059; Rundell 3,544,240; Randall 3,518,031; and Rundell 3,610,784. The term "magnet wire", in its broadest sense, refers to an insulated metal (preferably copper or aluminum) wire used in coils of electromagnetic machines, including the windings of motors, solenoids and transformers.

2. Description of the Prior Art

Numerous coated magnet wires for use in electric motors are known in the prior art. However, each of the prior art magnet wires has proven to be less than completely satisfactory for hermetic motor applications.

Typically, prior art magnet wires have received an outermost coating of a dry lubricant such as a paraffin wax melting in the range of about 40° to 60° C. The wax is used to reduce friction on the wire, thereby to enhance windability and insertability. However, when a wax-coated magnet wire is used in a hermetic unit, the paraffin wax must be rinsed off with a solvent. Suitable solvents are hot aliphatic liquids, such as heptane, and aromatic liquids, such as toluene. These solvents remove the wax in order to avoid blockage of capillary orifices in the hermetic unit by any traces of wax remaining on the wire after assembly.

It is a principal object of the present invention to provide a magnet wire for hermetic motors which avoids any need for solvent removal of a lubricant from the wire after winding onto a coil.

It is a related object of the invention to provide a lubricant for magnet wire having properties consistent with normal operation of hermetic motors even under extreme temperature conditions.

Additional objects and advantages of the present invention will be apparent to persons skilled in the art from the following specification.

SUMMARY OF THE INVENTION

The present invention can be summarized as providing an improved magnet wire comprising an aluminum or copper conductor wire and insulating intermediate layer adjacent and exterior to the wire, a polyamide outer layer adjacent and exterior to the intermediate layer, and an organic polymeric lubricant adjacent and exterior to the outer layer. The lubricant has a pour point below about 15° F. and wets the outer layer.

The insulating intermediate layer or basecoat preferably comprises a completely organic, thermosetting, modified polyester. The preferred polyamide outer layer or topcoat is selected from the group consisting of polyundecaneamide, polydodecaneamide, and mixtures and copolymers thereof. The intermediate layer comprises about 50 to 80% of the total coating thickness, and the outer layer comprises about 20 to 50% of the total coating thickness.

In a preferred embodiment, the lubricant applied to the outer layer has a viscosity at 100° F. (38° C.) of about 100 to 400 SUS (Saybolt Universal Seconds) or 21 to 87 centistokes, a pour point of about −60° F., and a molecular weight of about 200 to 800. The lubricant is a saturated $C_2$–$C_4$ ether of ethylene oxide and 1,2-propylene oxide copolymers, the ratio of ethylene oxide to propylene oxide being about 1:1 to 3:1. The monobutyl ether is preferred. The lubricant is soluble in monochlorodifluoromethane and in dichlorodifluoromethane.

DETAILED DESCRIPTION OF A PREFERRED EMBODIMENT

Figure 1:
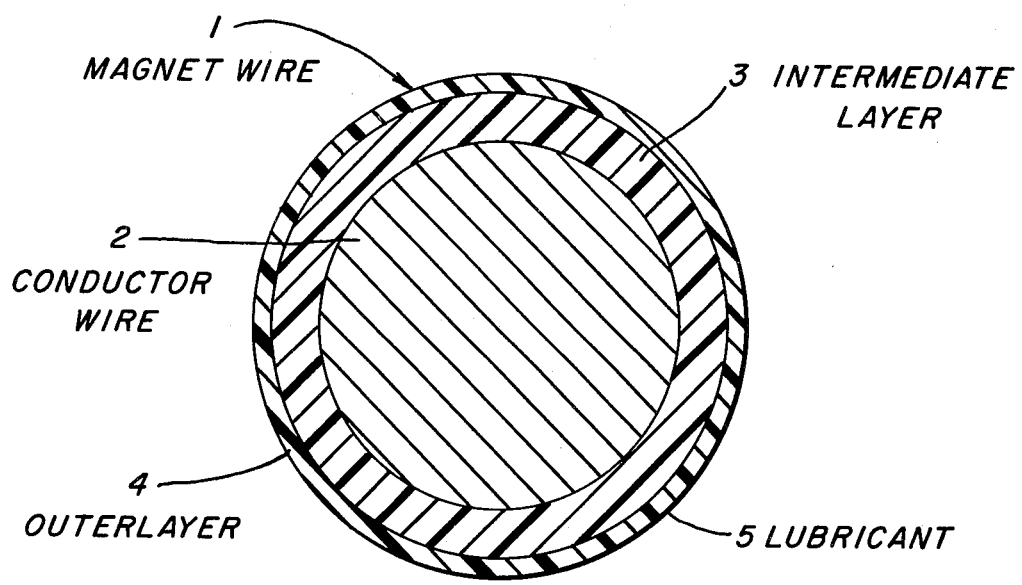
FIG. 1 is a cross-sectional view of a magnet wire for hermetic motors coated with an intermediate layer, outer layer and organic polymeric lubricant in accordance with the present invention.

FIG. 1 illustrates a preferred embodiment of a magnet wire of the present invention. The magnet wire 1 includes a centrally located conductor wire 2, usually a single strand, which is generally circular in cross section. Although the conductor wire is usually circular in cross section, it may also be drawn in square, rectangular, ribbon or other shapes.

An insulating intermediate layer or basecoat 3 is provided around and along the length of the conductor wire 2, as shown in FIG. 1. The intermediate layer preferably consists of a modified polyester for high temperature applications which desirably has a thickness of from approximately 0.002 to 0.03 millimeter. However, other basecoat materials are comprehended by the present invention, such as polyvinylformal, polyurethane and epoxies. Additional basecoat materials include acrylics, polyimides, amide-imides, imidized polyester and amide-imide polyesters. Some suitable polyesters include the standard thermal Class 155° F. polyester based on terephthalic acid (or ester), ethylene glycol and glycerol and the thermal Class 180° C. polyester typically based on terephthalic acid, THEIC (tris-hydroxyethyl isocyanurate) and ethylene glycol.

A particularly preferred basecoat material is sold by Westinghouse Electric Corporation under the trademark OMEGA. This material is a blend of a polymeric amide-imide-ester and a polyester. The polymeric amide-imide-ester is a reaction product of trimellitic anhydride, an aromatic diamino compound and a polyol component at least a portion of which is tris(2-hydroxyethyl) isocyanurate. The polyester is a reaction product of an aromatic carboxylic acid and a polyol component, at least a portion of which is tris(2-hydroxyethyl) isocyanurate. Additional information on this preferred basecoat material is found in U.S. Pat. No. 3,555,113, the disclosure of which is incorporated herein by reference.

Although not illustrated, the intermediate layer 3 may also comprise a multiple system. For example, the intermediate layer may include an amide-imide overcoated thermal Class 180° C. THEIC modified polyester or nylon 6,6 overcoated imidized polyester or polyethylene terephthalate overcoated polyester.

The topcoat or outer layer 4 of the present invention provided adjacent and exterior to the intermediate layer 3 is a polyamide, namely nylon 11, nylon 12 or mixtures or copolymers thereof. Additional details regarding composition of the intermediate layer 3 and outer layer 4 are provided in Otis et al U.S. Pat. No. 4,216,263, which patent is incorporated herein by reference to the extent not inconsistent with the present invention.

The magnet wire 1 of the present invention is provided with an organic polymeric lubricant 5 adjacent and exterior to the outer layer 4. While the polyamide outer layer 4 is characterized by a low coefficient of friction, it is useful to apply a lubricant coating to aid insertion and to improve windability of the magnet wire 1. Conventionally, lubricants applied to magnet wire have consisted of dry lubricants, such as paraffin wax. However, paraffin lubricants suffer from the disadvantage of being solid at room temperature. Other conventional lubricants while liquid at room temperature, have a tendency to block capillary passages in hermetic motors at low temperatures. Mineral oil based lubricants are undesirable because they do not wet nylon and tend to bead when applied to a nylon outer layer. The beading effect of mineral oil on magnet wire causes spotty lubrication, thereby resulting in poor winding and inserting characteristics.

In accordance with the present invention, a lubricant 5 is applied to the outer layer 4 by the magnet wire manufacturer. In contrast with prior art lubricants which usually are removed by solvents after winding, the lubricant 5 is here allowed to remain on the wire after winding into a coil. The lubricant 5 is an organic polymeric material that wets the outer layer 4 and has a pour point below about 15° F. (−9° C.). A pour point of about −60° F. (−51° C.) is preferred.

The lubricant is a reaction product of an alkyl alcohol with alkylene oxides. The alcohol is preferably a saturated $C_2$–$C_4$ alcohol and may be ethyl, propyl or butyl alcohol. The polyether or polyalkylene oxide portion may comprise a polymer or copolymer of ethylene oxide, propylene oxide, butylene oxide or copolymers or combinations of any two or three of the above. Molecular weight may vary from about 200 to 800. Viscosity varies from about 100 to 400 SUS (21 to 87 centistokes) at 100° F. (38° C.).

A particularly preferred lubricant is a monobutyl ether of ethylene oxide and 1,2-propylene oxide copolymers, wherein the ratio of ethylene oxide to propylene oxide is about 1:1 to 3:1. The lubricant has a viscosity of about 180 SUS (39 centistokes) at 100° F. (38° C.). An example is sold by Union Carbide Corporation under the trade designation Ucon 50 HB 180.

The lubricant is soluble in both Freon 22 (monochlorodifluoromethane) and Freon 12 (dichlorodifluoromethane). This property prevents precipitation in capillary passages of hermetic motors exposed to such solvents.

EXAMPLES

A single strand of No. 18 AWG magnet wire having a nylon 11 topcoat and lubricated in accordance with the present invention was tested against similar wires coated with a paraffin wax lubricant and with a mineral oil lubricant. Comparative tests were performed for static coefficient of friction, dynamic coefficient of friction and insertion. Results of these tests are summarized in Tables 1, 2 and 3. The static coefficient of friction shown in Table 1 is a measurement of force necessary to overcome the inertia of and start moving a 200 gram block. The dynamic coefficient of friction shown in Table 2 is measured by applying the wire to a polished sapphire surface with the wire moving steadily across the surface at 50 feet per minute. Both the static and dynamic coefficients of friction are dimensionless quantities.

TABLE 1

Static Coefficient of Friction

| | A | B | C |
|---|---|---|---|
| Lubricant | Dry (paraffin wax) | Present Invention | Mineral Oil |
| Coefficient of Friction (range) | .061–.070 | .079–.092 | .079–.092 |
| (Average of 6) | .069 | .086 | .084 |

TABLE 2

Dynamic Coefficient of Friction

| | A | B | C |
|---|---|---|---|
| Lubricant | Dry (paraffin wax) | Present Invention | Mineral Oil |
| Coefficient of Friction (range) | .054–.065 | .051–.062 | .074–.085 |
| (Average of 3) | .060 | .057 | .081 |

TABLE 3

Simulated Insertion

| | A | B | C |
|---|---|---|---|
| | | 10-turn Coil | |
| Lubricant | Dry (paraffin wax) | Present Invention | Mineral oil |
| Range | 7.4–8.0 lb. | 7.4–7.8 lb. | 7.6–7.8 lb. |
| Average of 3 | 7.7 | 7.6 | 7.7 |
| | | 12-turn Coil | |
| Range | 9.0–9.2 lb. | 8.6–9.0 lb. | 8.8–9.4 lb. |
| Average of 3 | 9.1 | 8.8 | 9.2 |

The simulated insertion test reported in Table 3 is designed to simulate the effect of inserting wound coils of wire into slots of a motor. The test was performed by drawing coils of a No. 18 AWG wire having a lubricated nylon 11 topcoat through a tapered oval aperture. Results are reported in terms of pounds force.

Results of the tests reported in Tables 1, 2 and 3 indicate that the lubricant of the present invention has properties comparable to mineral oil but slightly inferior to paraffin on the static coefficient of friction test. The lubricant of the invention is slightly superior to the other lubricants on the dynamic coefficient of friction and simulated insertion tests.

While the foregoing detailed description of our invention has been made with reference to a single preferred embodiment, numerous modifications and changes can be made therein without departing from the spirit and scope of the following claims.

What is claimed is:

1. A magnet wire suitable for use in an hermetic motor environment comprising
    a conductor wire;
    an insulating intermediate layer adjacent and exterior to said conductor wire;
    a polyamide outer layer adjacent and exterior to said intermediate layer, said polyamide being selected from the group consisting of polyundecaneamide, polydodecaneamide, and mixtures and copolymers thereof; and
    an organic polymeric lubricant adjacent and exterior to said outer layer, said lubricant comprising a saturated $C_2$–$C_4$ ether of ethylene oxide and 1,2-propylene oxide copolymers, the ratio of ethylene oxide to propylene oxide being about 1:1 to 3:1; said lubricant having a pour point below about 15° F., a viscosity at 100° F. of about 100 to 400 SUS, and a molecular weight of about 200 to 800; said lubricant wetting the outer layer, and being soluble in monochlorodifluoromethane and dichlorodifluoromethane.

2. The magnet wire of claim 1 wherein the pour point of said lubricant is about −60° F.

3. The magnet wire of claim 1 wherein said lubricant comprises a monobutyl ether of ethylene oxide and 1,2-propylene oxide copolymers.

4. The magnet wire of claim 1 wherein said magnet wire is self-bondable at elevated temperatures in the range of about 160° to 200° C., and said polyamide is polyundecaneamide.

5. The magnet wire of claim 1 wherein said intermediate layer comprises a completely organic, thermosetting, modified polyester.

6. The magnet wire of claim 1 wherein said intermediate layer comprises a blend of
  (a) a polymeric amide-imide-ester comprising the reaction product of
    (i) trimellitic anhydride,
    (ii) an aromatic primary diamino compound, and
    (iii) a polyol component, at least a portion of which is tris(2-hydroxyethyl) isocyanurate; and
  (b) a polyester comprising the reaction product of
    (i) an aromatic carboxylic acid, and
    (ii) a polyol component, at least a portion of which is tris(2-hydroxyethyl) isocyanurate.

7. The magnet wire of claim 1 wherein said intermediate layer comprises about 50 to 80% of the total coating thickness, and said outer layer comprises about 20 to 50% of the total coating thickness.

* * * * *